(No Model.)　　　　O. B. SHALLENBERGER.　　2 Sheets—Sheet 1.
PHASE ADJUSTMENT.

No. 548,231.　　　　　　　　　Patented Oct. 22, 1895.

WITNESSES:
Ethan D. Dodds
Hubert C. Tener

INVENTOR:
Oliver B. Shallenberger
BY
Terry, McKay & Carr
ATTORNEYS.

(No Model.) 2 Sheets—Sheet 2.

O. B. SHALLENBERGER.
PHASE ADJUSTMENT.

No. 548,231. Patented Oct. 22, 1895.

WITNESSES:
Ethan D. Dodds
Hubert C. Tener

INVENTOR
Oliver B. Shallenberger
BY
Terry, MacKaye & Carr
ATTORNEYS.

UNITED STATES PATENT OFFICE.

OLIVER B. SHALLENBERGER, OF ROCHESTER, PENNSYLVANIA.

PHASE ADJUSTMENT.

SPECIFICATION forming part of Letters Patent No. 548,231, dated October 22, 1895.

Application filed April 15, 1895. Serial No. 545,799. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Phase-Adjusting Methods and Means for Alternating-Current Apparatus, (Case No. 640,) of which the following is a specification.

My invention relates to apparatus for the utilization of alternating currents, and more particularly such apparatus as involves the use of alternating magnetic fields differing in phase. It is particularly applicable to instruments for indicating, measuring, or recording alternating currents, and I will describe it principally with reference to such use, although I do not limit myself to any particular application of the novel features of my invention.

It is well known that an alternating current may be caused to lag behind the impressed electromotive force which produces it by the introduction into the circuit of a coil possessing more or less self-induction. The magnetic field in the neighborhood of a conductor carrying such a current lags to a corresponding degree; but the lag is limited under practical conditions to an amount somewhat less than a quarter period—that is, ninety degrees—as commonly represented. By the use of my invention it is possible to greatly augment the angular displacement of the magnetic field from the impressed electromotive force, so that by its use in connection with the coil aforesaid or an equivalent device any desired phase angle may be obtained within wide limits. I employ it usually in connection with coils possessing a high coefficient of self-induction, where it is desired to obtain a magnetic field as nearly as possible in quadrature with the impressed electromotive force or with another magnetic field having a definite phase relation to the impressed electromotive force. I have described the use of this principle in connection with certain measuring instruments in patents granted me on the 1st of January, 1895, and numbered 531,867, 531,868, and 531,870, and it is therefore unnecessary to describe specifically herein all the modifications and detailed construction of such apparatus.

My invention may be more readily understood by reference to the accompanying drawings, in which—

Figure 1:
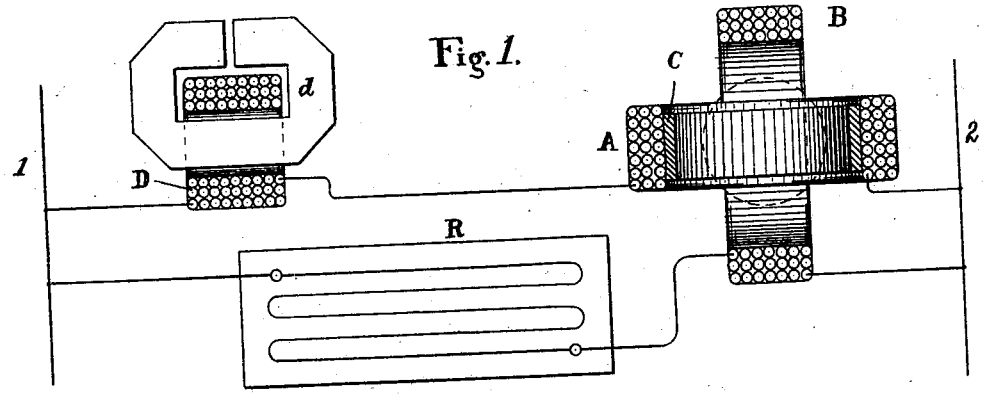
Figure 2:
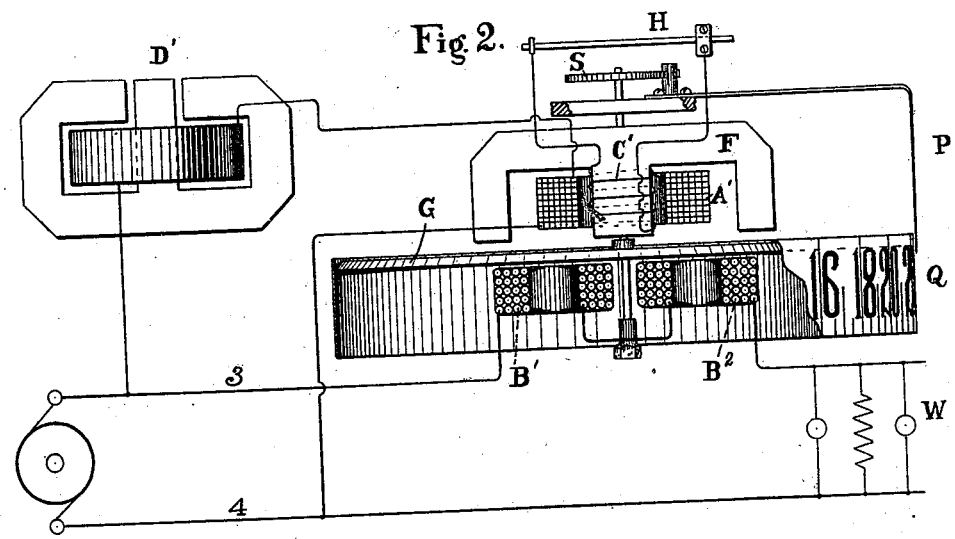
Figure 3:
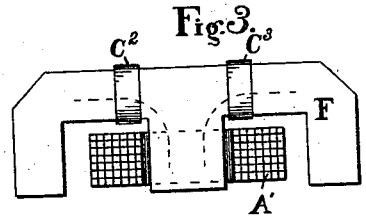
Figure 4:
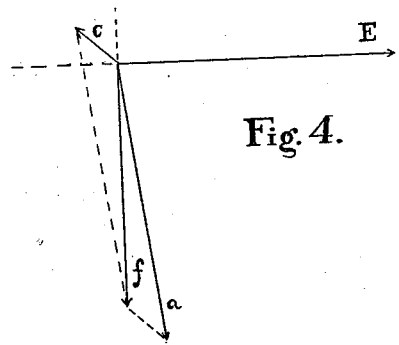
Figure 5:
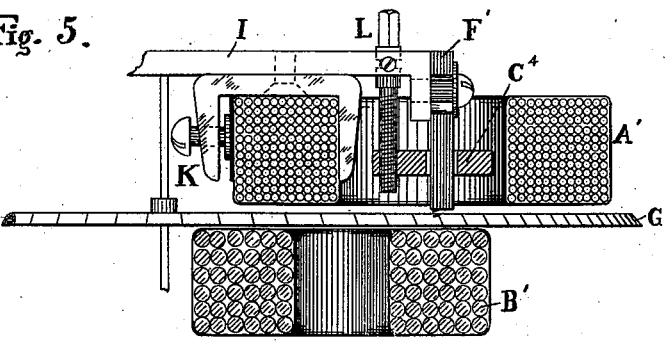
Figure 6:
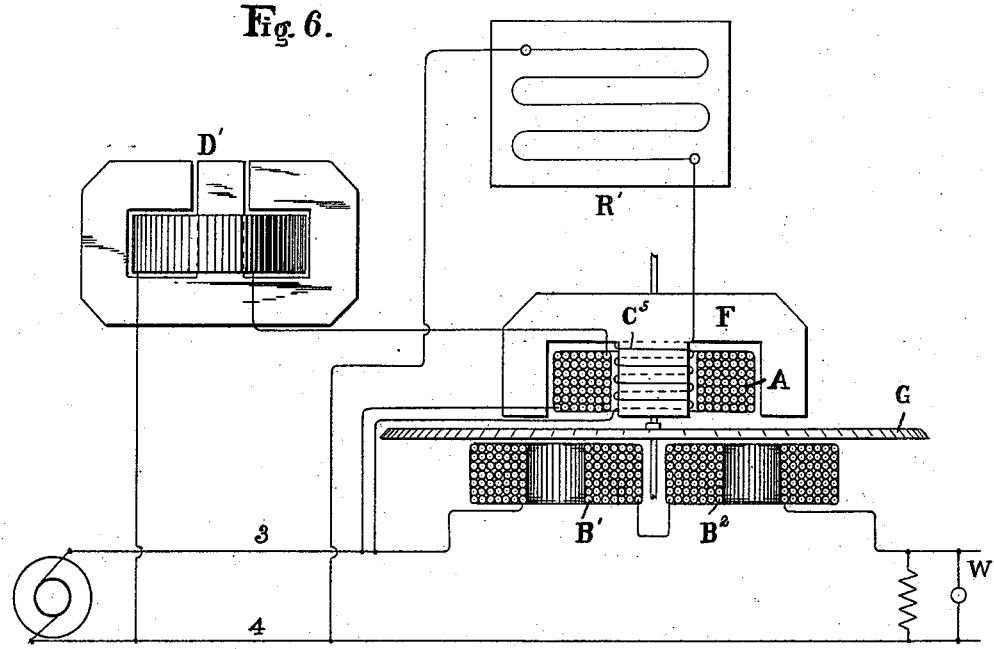
Figure 7:
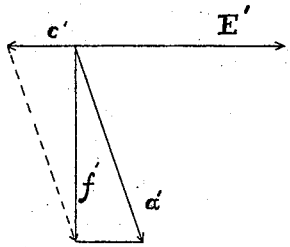

Figure 1 is a diagram showing an organization of circuits illustrating the use of my invention. Fig. 2 shows diagrammatically a form of apparatus embodying my invention. Fig. 3 is a detail view illustrating a modification of form. Fig. 4 is a diagram showing phase relations. Fig. 5 is a view, partially in section and partially in side elevation, of a portion of an alternating-current-measuring instrument provided with a slightly-modified form of my invention. Fig. 6 is a diagrammatic illustration of an apparatus embodying a further modification. Fig. 7 is a diagram showing the phase relations in the organization shown in Fig. 6.

Referring to Fig. 1, 1 2 are conductors connected to a source of alternating current. A is a field-coil connected in series with an inductance-coil D, wound about a laminated core $d$, and of suitable proportions to obtain a high coefficient of self-induction. B is a second field-coil, (here shown at a right angle to coil A and connected in series with a resistance R,) having a small self-induction. By suitably proportioning the circuits which include the coils A and B a difference of phase may be obtained between the magnetic fields of these coils approximating ninety degrees. In order to cause the field produced by the coil A to approach more nearly to exact quadrature with the field of the coil B, I introduce an auxiliary coil or conductor C, closed upon itself and within the inductive influence of the coil A, so that secondary alternating currents are induced in it upon the passage of an alternating current through coil A. This closed secondary circuit may consist either of a single turn of conducting material or of a coil of several turns, and may include within its circuit a definite and adjustable resistance, as will be described in connection with Fig. 2. The secondary current induced in the coil C differs in phase from the current in the coil A by an amount depending upon the construction, but necessarily within the limits of ninety degrees and one hundred and eighty degrees. It is essential that the coils A and C be so disposed magnetically with reference to each other that there may be no torque-producing interference of their magnetic fields, and whenever reference is hereinafter made to a symmetrical disposition of the primary and secondary coils it will be understood to mean such relative location of these coils that no torque-producing interference of their magnetic fields will result. These phase relations are further illustrated in Fig. 4, in which phase angles are indicated in the customary way by means of the angular position of lines. The line E represents at a given instant the electromotive force impressed upon the circuit 1 2, and corresponds in angular position with the phase of current through coil B when the circuit including said coil possesses no self-induction. The line $a$ represents the phase angle and magnitude of the magnetic field produced by the coil A and lagging, as shown, less than ninety degrees behind the impressed electromotive force E. The line $c$ represents by its magnitude and direction the strength and phase angle of the field produced by the induced currents in coil C. The line $f$, obtained by completing the parallelogram, represents in like manner the strength and phase angle of the resultant magnetic field which is exactly in quadrature with the impressed electromotive force represented by line E.

It is evident that by suitably proportioning the strength and phase angle of the field represented by the line $c$ the phase angle of the resultant magnetic field represented by line $f$ may be modified at will and may be caused to take a position either more or less than ninety degrees from the impressed electromotive force, if desired, or may be adjusted to quadrature as accurately as may be found necessary. This adjustment is effected by suitably proportioning the self-induction and resistance of the coil C. I have found in practice that the position of the resultant field may be varied through a considerable angle on either side of ninety degrees.

Fig. 2 shows a modification which I find useful in applying my invention to practice in connection with alternating-current-measuring instruments, and is here shown as applied to a watt-meter. A' is a shunt field-coil connected in series with an inductance coil D'. B' and B² are field-coils connected in series with the conductors 3 4, leading to the work circuit W. F is a core of soft iron or steel, a portion of which extends within the coil A'. A closed conductor C' also surrounds this portion of the core and corresponds to the coil C of Fig. 1. G is a disk of conducting material free to rotate within the influence of the magnetic fields produced by the various coils. The motion of the disk is opposed by the spring S proportionally to the deflection. The indication may be read by means of the scale Q, attached to the disk and the fixed index P. It is desirable in this instrument that the magnetic field produced by the shunt-connected coil A' and the core F should be in quadrature with the impressed electromotive force upon the circuit 3 4, under which conditions the torque upon the disk G will be proportional to the energy transmitted to the work circuit W. While it is possible to closely approximate this condition by the use of a suitably-proportioned inductance-coil at D' in the shunt-circuit, yet for greater accuracy and to secure greater range of operation the addition of the closed coil C' (herein shown and which constitutes the chief feature of my present invention) is sometimes desirable.

In some cases I find it desirable to use an adjustable resistance H in series with the coil C', (shown in Fig. 2 as a wire or rod longitudinally adjustable,) so as to vary its effective length. This resistance may be of any convenient form, and when once adjusted may be permanently connected in position; or it may be used from time to time to correct the indication of the instrument under conditions requiring such adjustment.

Fig. 3 shows another modification in which two closed secondaries C² and C³ are mounted on the core F in such a position that the lines of force passing through the coil A' pass also through said coils C² and C³. Although these coils are disposed substantially at right angles to the coil A', yet the three coils bear substantially the same magnetic relation to each other that they would if concentrically arranged, since their effective magnetic fields are substantially coincident in position, owing to the presence of the iron core. It is to be understood that the relation of the effective magnetic fields of the coils, hereinafter designated as "coincidence," is such a relation that there will be no torque produced upon an armature located in said fields solely by reason of the difference of phase existing between the currents in the coils in question.

Where the secondary is in the form of simple closed bands of conducting material, as indicated in Fig. 3, the dimensions and specific resistance must be so chosen as to produce the phase angle required. This may be determined by trial for the particular form of instrument in connection with which the coils are used.

In Fig. 5 the shunt-connected coil A', series-connected coil B', and the disk G of an alternating-current-measuring instrument are constructed and arranged in all essential particulars like the corresponding parts shown in Fig. 2. I is a portion of the framework of the machine, to which are attached the laminated core F', a portion of which extends into the coil A', and a clamp K for supporting the coil A' from said frame. C⁴ is the closed-circuit secondary coil, having any desired number of turns, but here indicated as a single-ring conductor located in inductive relation to the coil A' and surrounding a portion of the core F' and supported from the frame I by means of an adjusting-screw L, the latter having a screw-threaded engagement with said secondary coil. It will be readily seen that this arrangement permits of raising or lowering the coil C⁴ by turning the screw L in the one direction or the other, as may be desired. By means of this adjustment of the position of the coil C⁴ with reference to the coil A' and the disk G, I am enabled to produce substantially the same result that is secured in the modification shown in Fig. 2 by means of the adjustable resistance H.

In Fig. 6 the coils A', B', and B², core F, disk G, inductance-coil D', conductors 3 4, and work circuit W are constructed and arranged in all essential particulars like the corresponding parts shown in Fig. 2. In this form of the invention, however, an auxiliary coil C⁵, having a non-inductive resistance R', connected in series therewith, is connected in shunt upon the circuit 3 4. This coil is employed in lieu of the closed-circuit auxiliary coils shown in the other figures of the drawings, and may conveniently be located in substantially the same position with reference to the other parts of the apparatus, as is indicated in the drawings. The resistance R' will obviously be proportioned in accordance with the strength of auxiliary magnetic field desired, and the coil C⁵ will be so connected in circuit that the current therein and the magnetic field produced thereby will be approximately one hundred and eighty degrees from the electromotive force impressed upon circuit 3 4, as will be understood by referring to Fig. 7, in which the line E' represents at a given instant the electromotive force impressed upon the circuit 3 4 and corresponds in angular position with the phase of current through the coils B' B² when there is no self-induction in the work circuit. The line $a'$ represents the phase angle and magnitude of the magnetic field produced by the coil A' and lagging, as shown, less than ninety degrees behind the impressed electromotive force E'. The line $c'$ represents by its magnitude and direction the strength and phase angle of the field produced by the current in the coil C⁵, and the line $f'$ in like manner the strength and phase angle of the resultant magnetic field in quadrature with the impressed electromotive force E'.

It is evident that many other modifications of form may be adopted; but I have shown such forms as are necessary to illustrate my invention and render its method of operation sufficiently clear to enable those skilled in the art to embody the invention in any required form of apparatus. It is evident, also, that the same method may be applied to the modification of any magnetic field irrespective of the manner in which the primary angular position of that field may be obtained—such, for instance, as by the use of condensers or transformers in any well-known way.

I claim as my invention—

1. The combination with a field coil, of an inductive resistance in series therewith, a second field coil, an auxiliary coil having a magnetic circuit substantially coincident with that of said first-named field coil, and a closed circuit armature in inductive relation to the three coils.

2. The combination with a field coil, of a closed secondary coil in inductive relation thereto said coils having substantially coincident magnetic circuits, an inductive resistance in series with said field coil, a second field coil and a closed circuit armature.

3. In an electrical measuring instrument, an armature, an inductance coil, a field coil in series therewith, a closed secondary coil in inductive relation to the field coil and having its magnetic field presented to said armature coincidently therewith, and a third field coil, having its magnetic field displaced with reference to those of the other coils.

4. In an electric meter, in combination with means for producing a current lagging approximately ninety degrees behind its impressed electromotive force, a field coil traversed by said lagging current, an auxiliary coil having its effective magnetic field approximately coincident in position with that of said field coil and modifying the phase angle of said field so as to cause a resultant field practically in quadrature with the impressed electromotive force.

5. In an electric measuring device, the combination of an armature, a series connected field coil, a shunt connected field coil, and an auxiliary coil having its effective magnetic field approximately coincident in position with that of the shunt connected coil, all of said coils being inductively related to said armature.

6. In an electric meter operated by alternating currents differing in phase, the combination of a series connected coil and a shunt connected coil, a subdivided core for said shunt connected coil and a closed secondary circuit symmetrically disposed upon said core.

7. In an alternating current electric meter operated by currents differing in phase and comprising two actuating coils and means for causing the current through one of said coils to lag behind its electromotive force approximately ninety degrees, a core for said last named coil and an auxiliary coil symmetrically disposed upon said core.

8. The method of obtaining a magnetic field in quadrature with the impressed electromotive force which consists in lagging a derived current, producing thereby an independent lagging primary magnetic field, inducing by said field secondary currents, and adjusting said secondary currents to produce a secondary magnetic field of definite value, and combining said primary and secondary fields to form a resultant field of the required phase relation.

9. The method of obtaining a magnetic field in quadrature with the impressed electromotive force which consists in lagging a derived current, producing thereby an independent lagging initial magnetic field, producing an auxiliary magnetic field of definite value, and combining said primary and auxiliary fields to form a resultant field of the required phase relation.

In testimony whereof I have hereunto subscribed my name this 11th day of April, A. D. 1895.

OLIVER B. SHALLENBERGER.

Witnesses:
WM. G. WATT,
HUBERT C. TENER.